United States Patent [19]
Bussey, Jr. et al.

[11] Patent Number: 4,797,880
[45] Date of Patent: Jan. 10, 1989

[54] NON-BLOCKING, SELF-ROUTING PACKET SWITCH

[75] Inventors: Howard E. Bussey, Jr., Clinton; James N. Giacopelli, Flanders; William S. Marcus, New Providence, all of N.J.

[73] Assignee: Bell Communications Research, Inc., Livingston, N.J.

[21] Appl. No.: 106,575

[22] Filed: Oct. 7, 1987

[51] Int. Cl.$^4$ .............................................. H04J 3/26
[52] U.S. Cl. ........................................ 370/60; 370/94
[58] Field of Search ............................. 370/60, 85, 94; 340/825.52

[56] References Cited

U.S. PATENT DOCUMENTS

| | | | |
|---|---|---|---|
| 3,428,946 | 2/1969 | Batcher | 340/146.2 |
| 4,472,801 | 9/1984 | Huang | 370/60 |
| 4,516,238 | 5/1985 | Huang et al. | 370/60 |
| 4,536,873 | 8/1985 | Leete | 370/85 |
| 4,542,497 | 9/1985 | Huang et al. | 370/60 |
| 4,621,359 | 11/1986 | McMillen | 370/60 |
| 4,638,475 | 1/1987 | Koike | 370/60 |
| 4,646,287 | 2/1987 | Larson et al. | 370/94 |

Primary Examiner—Robert L. Griffin
Assistant Examiner—Melvin Marcelo
Attorney, Agent, or Firm—James W. Falk

[57] ABSTRACT

A full access, non-blocking, self-routing packet switch based on a Batcher sorting network is disclosed. Fake place holding packets are utilized along with a conflict resolution scheme to insure that during each packet switch cycle a packet is routed from each input port to each output port. The use of fake place holding packets insures that real packets which contain user data can be routed to the outputs having the addresses contained in their packet headers.

15 Claims, 2 Drawing Sheets

NON-BLOCKING, SELF-ROUTING PACKET SWITCH

FIELD OF THE INVENTION

The present invention relates to a non-blocking self-routing packet switch.

BACKGROUND OF THE INVENTION

An important element for providing advanced telecommunications services requiring large bandwidth is a high capacity packet switch capable of interconnecting a large number of input ports with a large number of output ports. A packet switch that can connect any specific input port to any specific output port is known as a full access packet switch.

Typically, such a packet switch is synchronous and the packets routed therein are of fixed length. During a packet switch cycle, packets present at the input ports are routed through an interconnect network comprising part of the packet switch to specific output ports. More particularly, if the interconnection network is self-routing, each packet arriving at an input port is provided with a header which contains the address of a specific output port to which the packet is to be routed. The interconnection network utilizes this address information to route the packets to the specific output ports.

A packet switch is internally non-blocking if it can deliver all packets from the input ports to the requested output ports when the packets are addressed to distinct output ports. However, there is still the possibility of external blocking, i.e. an internally non-blocking packet switch can still block if there are two simultaneous requests for the same output port. In this case, one or both packets directed to the same output port will be blocked or destroyed. Thus, a packet switch is desirably both internally and externally non-blocking.

One potential interconnection network for use in a packet switch is a digital sorting network developed by K.E. Batcher and disclosed in U.S. Pat. No. 3,428,946. Sorting involves rearranging an unordered sequence of numbers to create an ordered sequence of numbers. Basically, the Batcher sorting network comprises interconnected 2×2 switching nodes which can assume either a "pass-through" or a "cross" state. The decision as to which state a particular switching node assumes is determined by information contained in the headers of the packets present at the two inputs to the switching node. This characteristic of the switching nodes makes the Batcher network self-routing. Thus, packets arriving simultaneously at the inputs of a Batcher sorting network are sorted by the Batcher network so that they emerge in non-increasing or non-decreasing order according to an address contained in the packet header, which address, for example, corresponds to a destination address.

Batcher suggests in his patent that his sorting network may be used as a full access interconnection network because an input signal can, in effect, specify a connection to a particular output. The specified connections are made, according to Batcher, by numbering the outputs in order and presenting the number (i.e. the address) of a desired output as part of the input signal (e.g., as part of a packet header). The sorting network sorts the input signals so that each input signal emerges at the appropriate output as indicated by the output number or address contained therein.

Unfortunately, the Batcher sorting network, like all other sorting networks, has a serious drawback which prevents it from being used as an interconnection network for a full access packet switch. Specifically, the Batcher network fails to switch properly when there are inactive output ports (i.e. unsought destinations). Because a sorting network merely rearranges the order of the input signals and thus deals only with the positions of signals relative to the positions of other signals, the only time the Batcher network is sure to route input packets to the proper outputs is when each and every output port is the destination of one and only one input packet. These circumstances are generally not prevailing for packet switches used in actual telecommunications systems. In a typical packet switch cycle of a typical packet switch, there may be no packets addressed to certain output ports, while other output ports may have more than one packet addressed to them.

Accordingly, in order to use a sorting network such as the Batcher network as an interconnection network for a full access packet switch, it is necessary to account for unsought destinations and destinations sought by more than one packet. Solutions to the sorting network problems are presented in Huang et al., U.S. Pat. No. 4,516,238. In the Huang et al. patent, the appearance at the sorting network inputs of more than one packet addressed to a particular output is remedied by a trap network which is coupled to the outputs of the sorting network. The sorting network orders the packets in non-decreasing order according to destination (i.e. output) address and the trap network removes all but one packet seeking a particular destination. The occurrence of unsought destinations is remedied with a self-routing expander network located at the output of the trap network. Alternatively, a banyan network may be used for this purpose. Thus, in accordance with the disclosure of the Huang et al. patent, a full access, non-blocking, self-routing packet switch may be formed by utilizing a sorting network to sort input packets in non-decreasing order according to destination addresses contained in the packet headers, a trap network to remove all but one packet seeking each destination, and an expander network to route the remaining packets (i.e. those left by the trap network) to the destination addresses indicated in the packet headers.

It is an object of the present invention to provide a full access, non-blocking, self-routing packet switch utilizing a sorting network as an interconnection network without the use of a trap network and an expander or banyan network.

SUMMARY OF THE INVENTION

The present invention is a full access, non-blocking, self-routing packet switch based on a sorting network such as the Batcher sorting network described above. To form the packet switch, the sorting network is provided with a plurality of input ports and a plurality of output ports. A port is a place where a packet is delayed or processed before it enters the sorting network or after it leaves the sorting network. The number of input ports is equal to or is larger than the number of output ports. Each output port has an address and these addresses are typically assigned to the output ports in ascending order. During a transmission phase of each packet switch cycle, packets present at the input ports are synchronously routed through the sorting network to the particular output ports indicated by addresses in the packet headers. In a typical set of input packets there may be more than one packet addressed to some output ports. In addition, there may be other output ports to which no packets are addressed. As indicated above, a Batcher sorting network will not operate properly if there is more than one packet addressed to a particular output port or if there are inactive output ports (i.e. output ports to which no packets are addressed).

In accordance with our invention, the input ports are used to accomplish two processing phases before the start of the transmission phase of each packet switch cycle to insure that neither of the two above-mentioned conditions are present. As a result of these two processing phases exactly one packet is transmitted from an input port to each output port during each packet switch cycle so that there are no inactive output ports. This insures that the Batcher sorting network operates properly.

The first processing phase is a conflict resolution phase wherein conflicts are resolved between input ports that wish to transmit data packets to the same output port during a particular switch cycle. As a result of the conflict resolution phase, some input ports reserve output ports to which data packets are to be transmitted, while other input ports are unable to reserve an output port. Similarly, there may be output ports which are unreserved by any input port.

In the second processing phase of the packet switch cycle, input ports that have not previously reserved an output port are able to reserve one of the unreserved output ports. The result of this phase is that every output port is reserved by one input port.

During the transmission phase of the packet switch cycle, packets are routed from the input ports through the sorting network to the corresponding reserved output ports. The input ports which reserved output ports during the first (i.e. conflict resolution) processing phase transmit packets which contain actual user data. The input ports which reserved output ports during the second processing phase transmit fake, place holder, packets containing no actual user data. The real packets which contain actual user data and the fake place holder packets are internally marked as such so that only real packets proceed past the output ports.

The result of the two processing phase is that the addresses in the headers of the packets (real and fake) to be routed through the sorting network include some permutation of the set of output addresses (1,2,3, ... n). The Batcher sorting network sorts or reorders these packets according to the addresses so that the packet whose header contains address j is routed to output j. Thus, the fake place holding packets permit the real packets to be routed to the correct output port addresses by the sorting network.

In short, each packet switch cycle is divided into three phases: a first phase wherein conflicts between input ports wishing to send packets to the same output ports are resolved, a second phase wherein output ports not reserved in the first phase are reserved so that every output port is reserved by one input port, and a transmission phase wherein packets are transmitted through the sorting network from the input ports to the output ports.

It should be noted that the packet switch of the present invention may be capable of parallel operation. For example, the transmission phase of one packet switch cycle may overlap in time the first and/or second phases of a second packet switch cycle.

In this manner, a full access, non-blocking self-routing packet switch based on a sorting network is provided without the use of a trap network and an expander or banyan network.

DETAILED DESCRIPTION OF THE INVENTION

Figure 1:
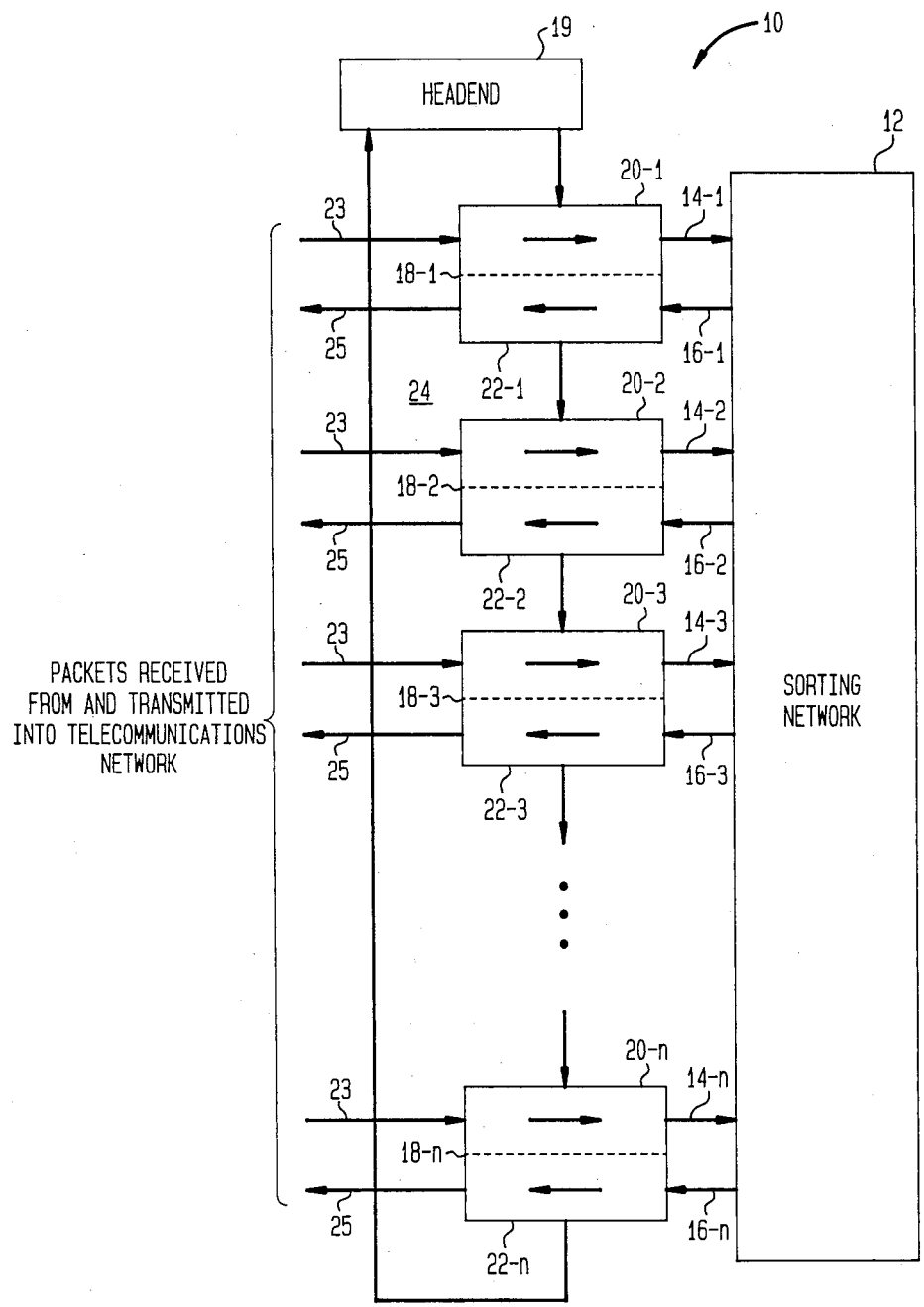
FIG. 1 schematically illustrates a full access, non-blocking, self-routing packet switch in accordance with an illustrative embodiment of the invention.

Turning to FIG. 1, a packet switch 10 is illustrated. The packet switch 10 illustratively comprises a Batcher sorting network 12. Data packets enter the sorting network on the input lines 14-1, 14-2, 14-3, ... 14-$n$. Data packets leave the sorting network on the output lines 16-1, 16-2 ... 16-$n$.

Each of the input lines 14 is connected to a port and each of the output lines 16 is also connected to a port. As indicated above, a port is a place where a packet can be delayed or processed before it enters the sorting network or after it leaves the sorting network. Input ports read out packets into the sorting network and output ports receive packets from the sorting network. In FIG. 1, the ports illustrated therein are duplex ports. To form a duplex port an input port and an output port are coupled together so that they can share some resources. These duplex ports are designated 18-1, 18-2, 18-3, 18-$n$. Each of the duplex ports comprises an input port equals the number of output 20-1, 20-2, 20-$n$ and an output port 22-1, 22-2, ... 22-$n$ so that the number of input ports equals the number of output ports. The output ports are given addresses 1,2,3, ... n in ascending order. Thus, the topmost output port has address #1 and the bottommost output port has address #n. Alternatively, separate input ports and output ports may be used, in which case the number of input ports may exceed the number of output ports. Data packets are received at the input ports 20 of the switch 10 from other parts of a telecommunications network via lines 23. Similarly, data packets are transmitted into the telecommunications network from the switch 10 via lines 25.

The sorting network 12 is synchronous. This means that packets are presented periodically and simultaneously across the sorting network inputs from where they are synchronously clocked through the sorting network. During the transmission phase of each packet switch cycle, the sorting network receives packets from the input ports and these packets are routed through the sorting network to particular output ports according to addresses contained in the packet headers.

In the packet switch 10, the duplex ports 18-1, 18-2, 18-3, ... 18-$n$ are connected in series with a hardend circuit 19 to form a ring 24. Bits circulating on the ring represent output ports. Thus, the third bit position on the ring corresponds to the third output port 22-3 and the nth-bit position on the ring represents the nth output port 22-$n$. Illustratively, each bit position may contain either a logic "0" indicating that the corresponding output port is not reserved or a logic "1" indicating that the corresponding output port is reserved.

As discussed above, the Batcher sorting network 12 will not operate properly as a full access interconnection network if for a particular switch cycle there is more than one packet addressed to a particular output port or if there are inactive output ports (i.e. output ports to which no packets are addressed).

To insure that neither of these conditions are present, each packet switch cycle comprises three phases. The result is that during each packet switch cycle exactly one packet is transmitted from the input ports to each output port to insure that the Batcher sorting network acts as a full access interconnection network.

The first phase is a conflict resolution phase wherein conflicts are resolved between input ports that wish to transmit data packets to the same output port. This first phase may be accomplished using the ring 24 as follows. Illustratively, all of the bits on the ring circulate once around the ring during the conflict resolution phase. As the bit positions circulate around the ring from one input port to the next, each input port keeps track of the bit positions as they pass by. If an input port has a data packet to send to a particular output port whose number (i.e. address) matches the bit position on the ring currently at that input port, and the bit in that position on the ring is logic "0" (i.e. the corresponding output port is unreserved), the input port writes a logic "1" into the bit position to reserve the corresponding output port for its data packet. On the other hand, if a ring bit position is logic "1", it means that the corresponding output port has been reserved by another input port and the present input port cannot reserve the corresponding output port.

As a result of the conflict resolution phase, some input ports reserve output ports to which data packets are to be transmitted, while other input ports are unable to reserve an output port. Similarly, there may be output ports which are unreserved by any input port.

In the second phase of each packet switch cycle, the ring bits circulate around the ring 24 a second time. Each input port which did not reserve an output port during the first (i.e. conflict resolution) phase, reserves the first available unreserved output port by writing a logic "1" into the appropriate ring bit position. The result of the second phase is that every output port has been reserved by one and only one of the input ports.

During the transmission phase of the packet switch cycle, the input ports transmit packets through the sorting network to the corresponding reserved output ports. These packets contain the addresses of the corresponding reserved output ports in their headers. Since there is one packet transmitted from the input ports to each output port and there are no omitted output ports, the sorting network operates properly as a full access interconnection network.

The input ports which reserved output ports during the first (i.e. conflict resolution) phase transmit actual packets with user data. The input ports which reserved output ports during the second phase transmit fake place holder packets containing no actual data to the corresponding output ports. The actual and fake packets are internally marked and the fake packets are transmitted no further than the corresponding output ports. The use of the fake place holder packets insures that there is one packet transmitted to each output port during each packet switch cycle, thereby insuring that the sorting network operates properly as a full access interconnection network.

It should be noted that the packet switch 10 of FIG. 1 may operate in parallel. Thus, during each packet switch cycle the first phase and the second phase follow serially, it is possible for the third (i.e. the transmission) phase of a first packet switch cycle to overlap in time the first and/or second phases of a second packet switch cycle.

Figure 2:
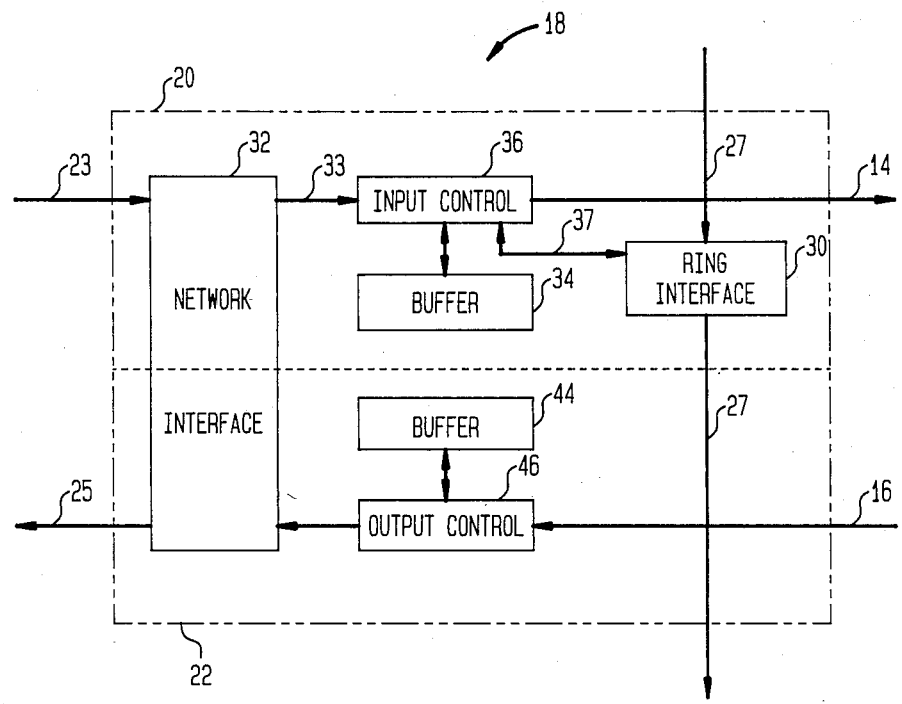
FIG. 2 schematically illustrates a duplex port for use in connection with the packet switch of FIG. 1.

A duplex port 18 of the type used to form the ring 24 of FIG. 1 is shown in greater detail in FIG. 2. The duplex port 18 comprises an input port portion 20 and an output port portion 22.

Each duplex port 18 includes a ring interface 30. The ring interfaces in all of the duplex ports 18-1, ... 18-n of FIG. 1 are connected by means of lines 27 to form the ring 24 of FIG. 1. The ring bits move from one ring interface 30 to the next via lines 27. Each ring interface 30 contains one bit of storage for storing a ring bit.

Data packets arrive at the port 18 from other parts of a telecommunications network via line 23 and enter the network interface 32. The network interface 32 serves to convert arriving packets from serial to parallel form and to remove any framing or protocol information unneeded for transmission through the packet switch. Arriving packets leave the network interface 32 via parallel lines 33 and are stored in buffer 34 under the control of input control 36. The buffer 34 may have a multiple packet capacity. At appropriate times, packets are transmitted out of the buffer 34 and into the sorting network via lines 14 under the control of input control 36.

When a ring bit position is received, the ring interface 30 outputs a signal via lines 37 to the input control 36 indicating a valid ring bit is received. This causes a ring bit position counter (not shown) associated with the input control 36 to be increased. The ring interface 30 also reads each bit on the ring and outputs a signal via lines 37 indicating whether the corresponding output port has been previously reserved by an input port. Based on the information received, input control circuitry 36 communicates with the ring interface 30 via lines 37 to tell the ring interface whether to write the bit position out unchanged or to change a logic "0" value to a logic "1" so as to reserve a particular output part for the input port.

During the first or conflict resolution phase of a packet swtch cycle, the decision as to whether or not to write a logic "1" into a ring bit position is based on whether there is a match between the number in the ring bit position counter and the address contained in the header of a packet stored in buffer 34. During the second phase of a packet switch cycle an input port that did not reserve an output port during the conflict resolution phase will reserve the first available output port as indicated by the occupancy of the corresponding ring bit positions. Thus, during the second phase of a packet switch cycle, the input control 36 will cause a logic "1" to be written into the first empty ring bit position received by its ring interface. The input control 36 keeps track of which output port has been reserved and the phase in which the output port has been reserved. If the input port reserved an output port during the conflict resolution phase of the packet switch cycle, then the input control 36 causes an actual data packet to be transmitted from the buffer 34 into the sorter network at the start of the transmission phase. On the other hand, if the input port reserved an output port during the second phase of the packet switch cycle, the input control 36 causes a dummy packet containing no actual user data to be routed through the sorting network.

When a packet leaves the sorter network via lines 16, it may be temporarily stored in buffer 44 under the control of output control circuit 46. Network interface 32 serves to supply protocol information to packets leaving the switch and convert such packets from parallel to serial form for transmission via line 25 to other parts of the telecommunications network.

The headend circuit 19 of the ring 24 of FIG. 1 is responsible for generating timing sequences for the ring 24 and for insuring that there are an appropriate number of bit positions on the ring. Details of a headend circuit are disclosed in Bingham et al. "Enhanced Efficiency Batcher-Banyan Switch", U.S. patent application Ser. No. 945,079 filed on Dec. 22, 1986 and assigned to the assignee hereof. The contents of this patent application are incorporated herein by reference. This patent application has issued as Bingham et al. U.S. Pat. No. 4,761,780, Aug. 2, 1988.

Finally, the above described embodiments of the invention are intended to be illustrative only. Numerous alternative embodiments may be devised by those skilled in the art without departing from the spirit and scope of the following claims.

What is claimed is:

1. A full access packet switch for use in a telecommunications network comprising:
    a self-routing sorting network having a plurality of inputs and a plurality of outputs, said sorting network being adapted to route a set of packets from said inputs to said outputs so that said packets emerge from said network in an order according to addresses contained in said packets, and
    means associated with said inputs for resolving conflicts if more than one packet contains the same output address and for generating dummy packets containing no actual user data to insure that said set of packets includes one packet destined for each output port.

2. the network of Claim 1 wherein said sorting network is a Batcher sorting network.

3. A full access switch for use in a telecomaunications network comprising:
    a sorting network,
    a plurality of input ports connected to the sorting network for transmitting data signals into the sorting network, and
    a plurality of output ports connected to the sorting network for receiving data signals from said sorting network,
    said input ports being adapted to resolve conflicts among said data signals if more than one of said data signals is addressed to the same output port,
    said input ports being further adapted to generate dummy signals containing no user data to insure there is one data signal addressed to each output port.

4. The switch of Claim 3 wherein said input ports are connected in a ring adapted to circulate a plurality of bits including one bit corresponding to each of said output ports.

5. The switch of claim 4 wherein during a first cycle of said bits around said ring, said input ports are adapted to read and write said bits to enable particular input ports to reserve particular output ports, whereby output port conflicts among said data signals are resolved.

6. The switch of claim 5 wherein during a second cycle of said bits around said ring said input ports are adapted to read and write said bits to reserve output ports to which said dummy signals are to be routed.

7. The switch of claim 3 wherein the number of input ports equals the number of output ports.

8. The switch of claim 3 wherein the number of input ports is larger than the number of output ports.

9. A full access packet switch comprising:
    a sorting network having a plurality of inputs and a plurality of outputs, and
    input means associated with said inputs and operative during a first phase of a packet switch cycle for resolving output address conflicts among packets received by said input means for routing through said sorting network, said input means being further operative during a second phase of said packet switch cycle for insuring that input packets to said sorting network include one packet addressed to each output,
    said sorting network being operative during a third phase of said packet switch cycle to route said input packets from said inputs to said outputs.

10. The switch of claim 9 wherein said input means is adapted to generate dummy packets containing no actual user data to insure one of the input packets is addressed to every output.

11. The switch of claim 9 wherein said input means comprises a plurality of input ports connected in a ring adapted to circulate a plurality of bits including one bit corresponding to each output.

12. A method for routing data packets through a packet switch from a plurality of inputs to a plurality of outputs comprising:
    at said inputs, resolving conflicts among said data packets if there is more than one packet addressed to a particular output of said switch and generating dummy packets containing no actual data to provide a set of packets including one packet addressed to every output port of said switch, and
    routing said set of packets from said inputs through a sorting network to said outputs.

13. A method for routing data packets received at from a plurality of input ports to a plurality of output ports of a packet switch during a packet switch cycle, the packet switch including a sorting network, the method comprising the steps of,
    during a first phase of said packet switch oyole, resolving output port conflicts among said data packets,
    during a second phase of said packet switch cycle, insuring that input packets to said sorting network include one packet addressed to each of said output ports, and
    during a third phase of said packet switch cycle, routing said input packets from said input ports through said sorting network to said output ports.

14. A packet switch comprising
    a sorting network having a plurality of inputs and a plurality of outputs,
    a plurality of input ports connected to the inputs of said sorting network, and
    a plurality of output ports connected to the outputs of said sorting network,
    said input ports being adapted for resolving conflicts among data packets if there is more than one packet addressed to a particular output port and for generating dummy packets containing no actual data to provide a set of packets to be routed through said sorting network including one packet addressed to every output port.

15. A full access packet switch for use in a telecommunications network to route data packets, said switch comprising:

a sorting network having a plurality of inputs and a plurality of outputs, and means associated with said inputs of said sorting network for resolving conflicts among said data packets if there is more than one packet addressed to a particular output and for generating dummy packets containing no actual data to provide a set of packets to be routed through said sorting network including one packet addressed to every output.

* * * * *